No. 796,316.
PATENTED AUG. 1, 1905.
P. J. GARRISON.
CAR WHEEL.
APPLICATION FILED MAY 1, 1905.
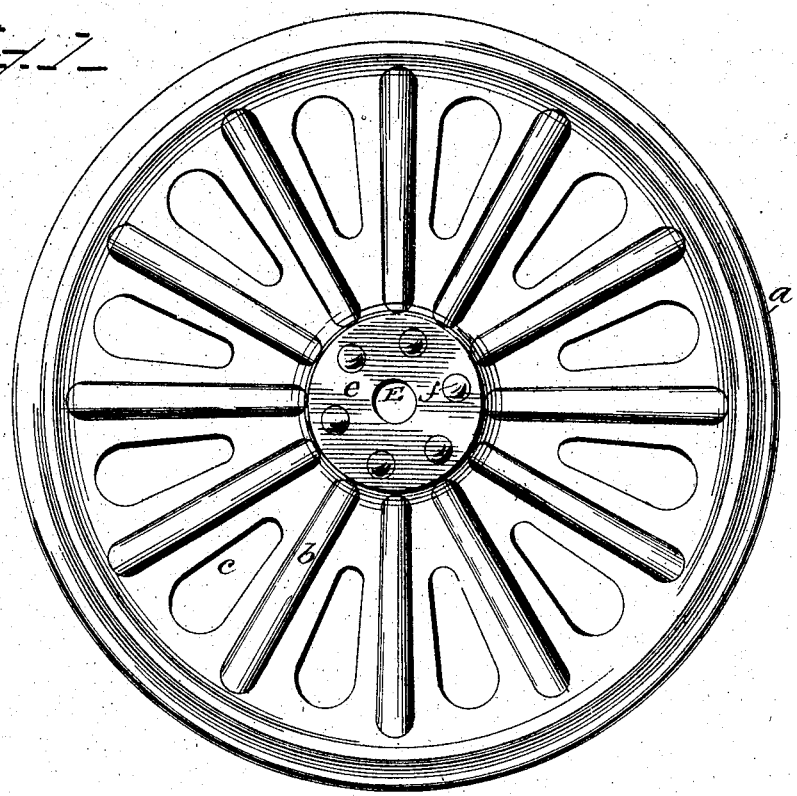
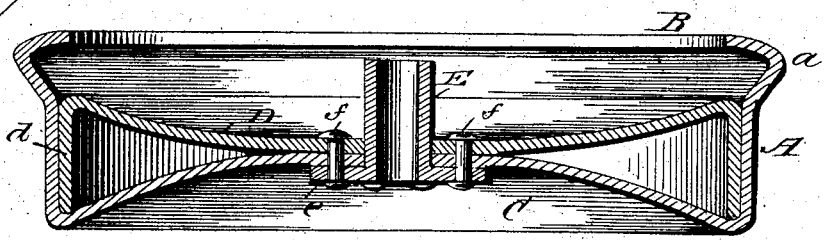
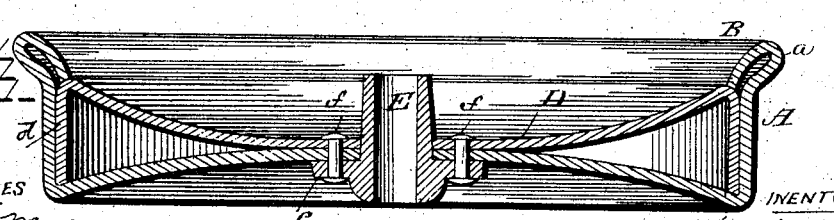
WITNESSES
M. E. Moore.
Wm. P. Goddard.
INVENTOR
Perry J. Garrison
per Chas. H. Fowler
Attorney

UNITED STATES PATENT OFFICE.

PERRY J. GARRISON, OF THREE RIVERS, MICHIGAN.

CAR-WHEEL.

No. 796,316.  Specification of Letters Patent.  Patented Aug. 1, 1905.

Application filed May 1, 1905. Serial No. 258,241.

*To all whom it may concern:*

Be it known that I, PERRY J. GARRISON, a citizen of the United States, residing at Three Rivers, in the county of St. Joseph and State of Michigan, have invented certain new and useful Improvements in Car-Wheels; and I do hereby declare that the following is a full, clear, and exact description of the same, reference being had to the annexed drawings, making a part of this specification, and to the letters of reference marked thereon.

The present invention has for its object to provide a car or other like wheel, preferably constructed of pressed steel, in which will be embodied both lightness and strength and that portion of the wheel subject to the most wear will be reinforced and the sides thereof form a brace each for the other, whereby a superior wheel is the result that will withstand heavy loads and capable of manufacture at a comparatively small cost over the wheels in common use.

The invention consists in a car or other wheel constructed substantially as shown in the drawings and hereinafter described and claimed.

Figure 1 of the drawings is a side elevation of a car or other wheel constructed substantially in accordance with my invention; Fig. 2, a horizontal section thereof; Fig. 3, a similar view showing a modification of the wheel.

In the accompanying drawings, A represents the annular rim of the wheel, which forms the usual tread thereof and which is pressed or otherwise formed into shape to provide the usual flange $a$ to the rim.

The rim and flange above described is preferably formed from a suitable blank of steel from which the side B of the wheel is constructed and may be of any suitable shape, with corrugations $b$ and openings $c$ or perfectly plain, as found most preferable, the form of the side of the wheel being left entirely to the judgment of the manufacturer. The opposite side of the wheel is formed by the concave disk C, which is integral with the rim A of the wheel, and between the disk and the side B thereof is a reinforce-disk D, which is also concave, as shown in Fig. 2 of the drawings. The disk D has a reinforce-flange $d$, which abuts against the rim A of the wheel, thereby strengthening it and enabling the rim to withstand greater pressure and weight and increasing the wheel from its center to its rim through the medium of the inner disk with its reinforce-flange. The disks C D have openings or perforations at their center, through which extend a tubular hub E, said hub having an annular flange $e$, to which the disks are secured by rivets $f$ or by any other preferred and well-known means.

In Fig. 3 is shown a modification of the wheel in that the flange $a$ of the rim B is bent down in the form shown to give additional strength thereto, the end of the flange abutting against the juncture of the disk D and flange $d$.

It will be noticed that the outer and the inner disks C D, respectively, are oppositely concave to increase the strength of the wheel from the center to the rim thereof, the disks being some distance apart at the rim of the wheel and gradually come together until the disks abut against each other at or near the center of the wheel, at which point the disks are connected together and to the flange of the hub. The above arrangement of the two disks gives strength to the wheel where most needed, and the center of the wheel around the hub being reinforced and strengthened by the two disks coming together and fastened thereto provides a superior wheel.

It should be understood that the flange $d$ of the concave disk D is of a width equal to the width of the tread of the wheel, and the said flange abuts directly against the tread without any interposed packing or other means to separate the tread and flange, thereby avoiding bolts or other like fastenings to secure the tread and flange together.

The flange $d$ of the disk D being of equal width to the tread of the wheel and employing two disks oppositely concave and gradually separating in a direction from the center of the wheel to the tread thereof for the purposes hereinbefore described are the essential features of the invention, and with this construction a superior wheel is provided.

A wheel constructed as herein described enables a perfect and both strong and durable wheel to be provided that will be simple in construction, which will greatly reduce the cost of manufacture, and possess increased wearing qualities as well as lightness. The tread of the wheel being double thickness through the medium of the flange upon the inner one of the disks and providing two disks and bringing them together at the center of the wheel also increases the strength of the wheel at the bearing-point. The two disks, one of which forms a reinforce to the other at the center of the wheel and a reinforce to the tread thereof by an abutting flange upon one of said disks, render the wheel superior in strength without adding to the expense of manufacture.

Having now fully described my invention, what I claim as new, and desire to secure by Letters Patent, is—

A metal wheel comprising an outer disk having a tread and flange thereto, and an inner disk with a circumferential flange of a width equal to the width of the tread and extending in a direction toward the outer disk and abutting directly against said tread to reinforce the same, the two disks being oppositely concave and separated the width of the tread and gradually coming together in a direction toward the center of the wheel where the disks abut against each other and a hub to which the abutting ends or edges of the disks are secured, substantially as and for the purpose set forth.

In testimony whereof I affix my signature in presence of two witnesses.

PERRY J. GARRISON.

Witnesses:
  J. I. ROBINSON,
  ROY GLEASON.